US012562970B2

(12) United States Patent
Rayes et al.

(10) Patent No.: US 12,562,970 B2
(45) Date of Patent: Feb. 24, 2026

(54) NETWORK ENERGY UTILIZATION REPORTING AND BENCHMARKING

(71) Applicant: Cisco Technology, Inc., San Jose, CA (US)

(72) Inventors: Ammar Rayes, Alamo, CA (US); Samer M. Salam, Beirut (LB); Balaji Venkatraman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/590,852

(22) Filed: Feb. 28, 2024

(65) Prior Publication Data

US 2025/0274364 A1     Aug. 28, 2025

(51) Int. Cl.
| | |
|---|---|
| *H04L 43/0876* | (2022.01) |
| *H04L 41/14* | (2022.01) |
| *H04L 43/06* | (2022.01) |
| *H04L 43/08* | (2022.01) |
| *G06F 15/16* | (2006.01) |

(52) U.S. Cl.
CPC .............. *H04L 43/08* (2013.01); *H04L 43/06* (2013.01)

(58) Field of Classification Search
CPC ......... H04L 43/08; H04L 43/06; H04L 43/12; H04L 41/14; H04L 43/0876; G06F 11/30; G06F 11/34; G96F 15/16
USPC ....................................................... 709/224
See application file for complete search history.

(56) References Cited

U.S. PATENT DOCUMENTS

| | | | |
|---|---|---|---|
| 12,021,689 B1* | 6/2024 | Rayes | ................ H04L 43/0876 |
| 2006/0161310 A1 | 7/2006 | Lal | |
| 2011/0320054 A1 | 12/2011 | Brzezowski | |
| 2012/0173444 A1* | 7/2012 | Zik | ........................ G06Q 10/10 |
| | | | 705/317 |
| 2012/0271669 A1 | 10/2012 | Taper et al. | |
| 2013/0268325 A1 | 10/2013 | Dembo | |
| 2017/0052536 A1* | 2/2017 | Warner | ............ G06Q 10/06312 |
| 2020/0290742 A1* | 9/2020 | Kumar | .................... B64D 27/10 |

(Continued)

FOREIGN PATENT DOCUMENTS

| | | |
|---|---|---|
| AU | 2010257235 A1 | 6/2011 |

*Primary Examiner* — Jude Jean Gilles

(74) *Attorney, Agent, or Firm* — Rutan & Tucker, LLP; Ravi Mohan; Marc McClain

(57)     ABSTRACT

Described herein are devices, systems, methods, and processes for benchmarking sustainability in information technology (IT) infrastructure. A data collection module may gather sustainability-related telemetry metrics from various sources, such as, but not limited to, network elements, internet of things (IoT) endpoints, and/or building management systems. A computation module can establish sustainability benchmarks based on the collected metrics and one or more network sustainability indexes. The telemetry metrics may include power usage per device, per device component, per device family, and/or per network. The telemetry metrics can also encompass power saved due to switching devices to the power saving mode or due to device configuration. The system may normalize the benchmark to eliminate bias towards smaller networks. An output module can provide visibility to users on their sustainability journey and may suggest actionable insights for improvement if the network or device is underperforming compared to its peers.

19 Claims, 10 Drawing Sheets

(56) References Cited

U.S. PATENT DOCUMENTS

| | | | |
|---|---|---|---|
| 2024/0036999 A1* | 2/2024 | Aurongzeb | ........... G06F 9/5055 |
| 2025/0045125 A1* | 2/2025 | Iyengar et al. | ..... H04L 43/0876 |

* cited by examiner

| | Week of 8/7/23 | Week of 8/14/23 | Week of 8/21/23 | Week of 8/28/23 | Week of 9/4/23 | Week of 9/11/23 | Week of 9/18/23 | Week of 9/25/23 | Week of 10/2/23 |
|---|---|---|---|---|---|---|---|---|---|
| Energy Usage (kWh) | 23.5 | 24 | 23.07 | 23.5 | 22 | 55.5 | 53 | 56.7 | 55.7 |
| Traffic Usage (GB) | 10 | 9 | 10.5 | 11 | 9.4 | 10.3 | 11.2 | 13.1 | 10 |

WEEK

------ Energy Usage (kWh)

——— Traffic Usage (GB)

700

ESTABLISH COMMUNICATION WITH NETWORK DEVICES — 710

COLLECT NETWORK TELEMETRY DATA — 720

GENERATE SUSTAINABILITY BENCHMARKS — 730

COMPARE SUSTAINABILITY BENCHMARKS TO CORRESPONDING THRESHOLDS — 740

DETERMINE SUGGESTED ACTIONABLE ITEMS — 750

800

ESTABLISH COMMUNICATION WITH NETWORK DEVICES — 810

COLLECT NETWORK TELEMETRY DATA — 820

DETERMINE A METRIC INDICATIVE OF AN AVERAGE ENERGY CONSUMPTION PER UNIT OF DELIVERED TRAFFIC — 830

GENERATE SUSTAINABILITY BENCHMARKS — 840

COMPARE SUBSTANTIALITY BENCHMARKS TO CORRESPONDING THRESHOLDS — 850

DETERMINE SUGGESTED ACTIONABLE ITEMS — 860

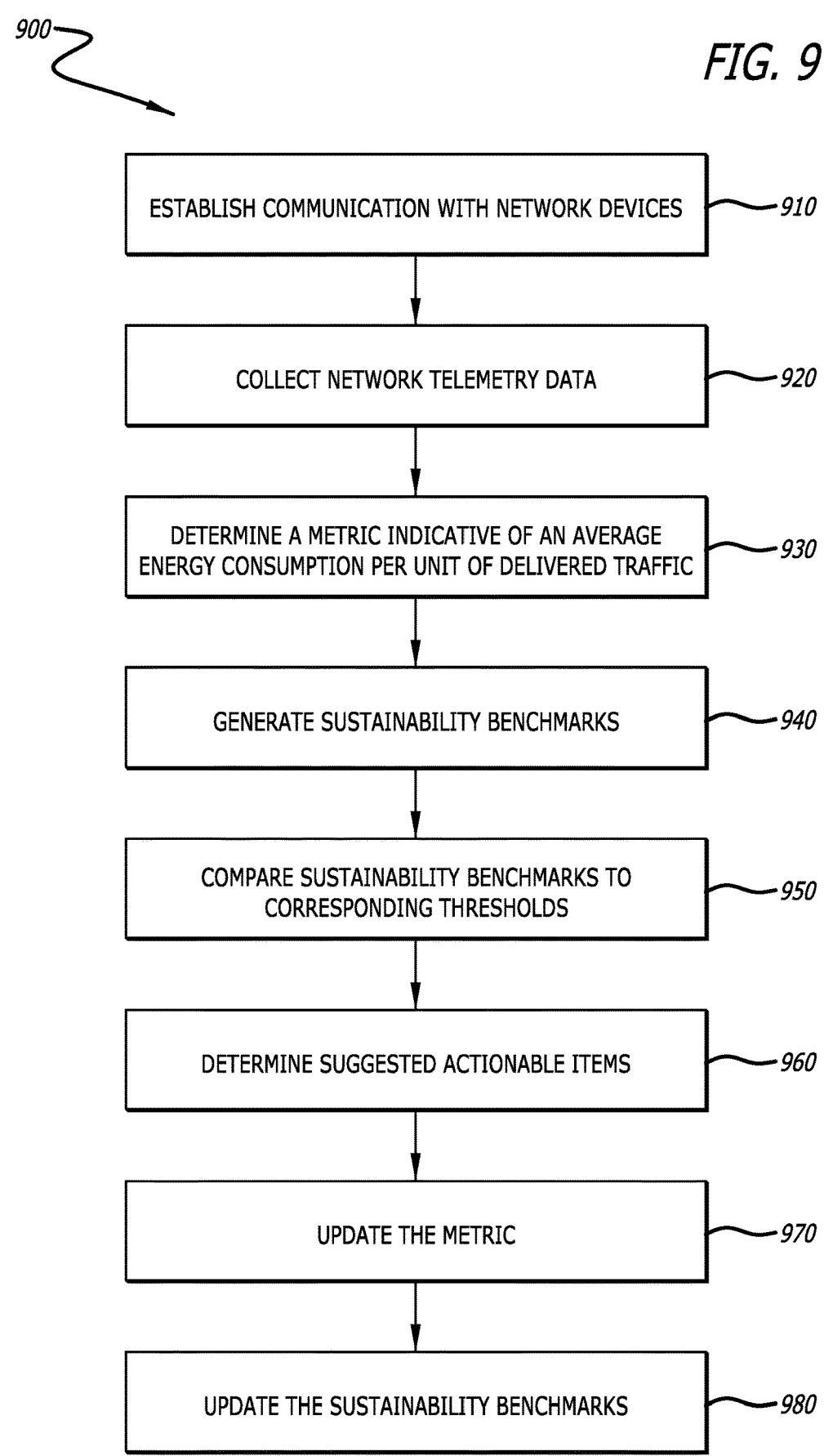

ESTABLISH COMMUNICATION WITH NETWORK DEVICES — 910

COLLECT NETWORK TELEMETRY DATA — 920

DETERMINE A METRIC INDICATIVE OF AN AVERAGE ENERGY CONSUMPTION PER UNIT OF DELIVERED TRAFFIC — 930

GENERATE SUSTAINABILITY BENCHMARKS — 940

COMPARE SUSTAINABILITY BENCHMARKS TO CORRESPONDING THRESHOLDS — 950

DETERMINE SUGGESTED ACTIONABLE ITEMS — 960

UPDATE THE METRIC — 970

UPDATE THE SUSTAINABILITY BENCHMARKS — 980

NETWORK ENERGY UTILIZATION REPORTING AND BENCHMARKING

The present disclosure relates to information technology (IT) infrastructure management. More particularly, the present disclosure relates to benchmarking sustainability in IT infrastructure.

BACKGROUND

The management of energy consumption in information technology (IT) infrastructure has become a significant concern in recent years. With the proliferation of network devices, servers, and data centers, the energy footprint of IT operations has grown significantly. This increase in energy consumption not only contributes to higher operational costs but also has a significant environmental impact.

Current approaches of managing energy consumption in IT infrastructure often focus on individual devices or components. These approaches typically involve monitoring the power usage of each device and implementing power-saving features where possible. However, these approaches often lack a holistic view of the entire IT infrastructure, making it difficult to identify areas of inefficiency or to compare the performance of different parts of the network.

Furthermore, existing solutions often fail to provide meaningful benchmarks for sustainability. While they may track total energy consumption, they often do not account for the size or complexity of the network, leading to biased results. Smaller networks may appear more energy-efficient simply because they consume less total energy, even if they include many energy-inefficient devices.

Additionally, current solutions often lack actionable insights for improving sustainability. While they may identify areas of high energy consumption, they often do not provide specific recommendations for reducing this consumption. This leaves IT professionals without clear guidance on how to improve the sustainability of their infrastructure.

SUMMARY OF THE DISCLOSURE

Systems and methods for benchmarking sustainability in IT infrastructure in accordance with embodiments of the disclosure are described herein. In some embodiments, a sustainability logic is configured to collect network telemetry data from the network, generate one or more sustainability benchmarks based on the network telemetry data, compare the generated one or more sustainability benchmarks to one or more thresholds, and determine one or more suggested actionable items in response to at least one of the one or more sustainability benchmarks being less than a corresponding threshold.

In some embodiments, the one or more sustainability benchmarks are associated with at least one of one or more devices of the network, a part of the network, or the network.

In some embodiments, the network telemetry data includes power usage data or power saving data.

In some embodiments, the power usage data is associated with at least one of each of one or more first devices, each of one or more device components, each of one or more device families, or the network.

In some embodiments, the power usage data corresponds to a period of time.

In some embodiments, the power saving data is associated with a power saving mode or one or more device configurations.

In some embodiments, the one or more sustainability benchmarks are generated based further on a network sustainability index.

In some embodiments, the generated one or more sustainability benchmarks include at least one of one or more device benchmarks, one or more internal network-wide benchmarks, or one or more external network-wide benchmarks.

In some embodiments, each of the generated one or more sustainability benchmarks includes a baseline or a trend.

In some embodiments, each of the generated one or more sustainability benchmarks includes a power consumption or a carbon footprint.

In some embodiments, the sustainability logic is further configured to determine, for the network, a metric indicative of an average energy consumption per unit of delivered traffic, and a sustainability benchmark associated with the network is generated based at least part on the metric.

In some embodiments, the sustainability logic is further configured to periodically update the metric for the network.

In some embodiments, the metric is updated for the network approximately hourly.

In some embodiments, the sustainability logic is further configured to periodically update the generated one or more sustainability benchmarks.

In some embodiments, the determined one or more suggested actionable items includes upgrading software of a device of the network.

In some embodiments, the determined one or more suggested actionable items includes upgrading hardware of a device of the network.

In some embodiments, the determined one or more suggested actionable items includes adjusting a device configuration of a device of the network.

In some embodiments, the sustainability logic is further configured to cause the determined one or more suggested actionable items to be displayed to a user.

In some embodiments, a sustainability logic is configured to collect network telemetry data from the network, generate one or more sustainability benchmarks based on the network telemetry data, compare the generated one or more sustainability benchmarks to one or more thresholds, determine one or more suggested actionable items in response to at least one of the one or more sustainability benchmarks being less than a corresponding threshold, and cause the determined one or more suggested actionable items to be displayed to a user.

In some embodiments, managing sustainability of a network includes collecting network telemetry data from the network, generating one or more sustainability benchmarks associated with at least one of one or more devices of the network, a part of the network, or the network based on the network telemetry data, comparing the generated one or more sustainability benchmarks to one or more thresholds, and determining one or more suggested actionable items in response to at least one of the one or more sustainability benchmarks being less than a corresponding threshold.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 9 is a flowchart showing a process for managing sustainability in a network in accordance with various embodiments of the disclosure.

Figure 1:
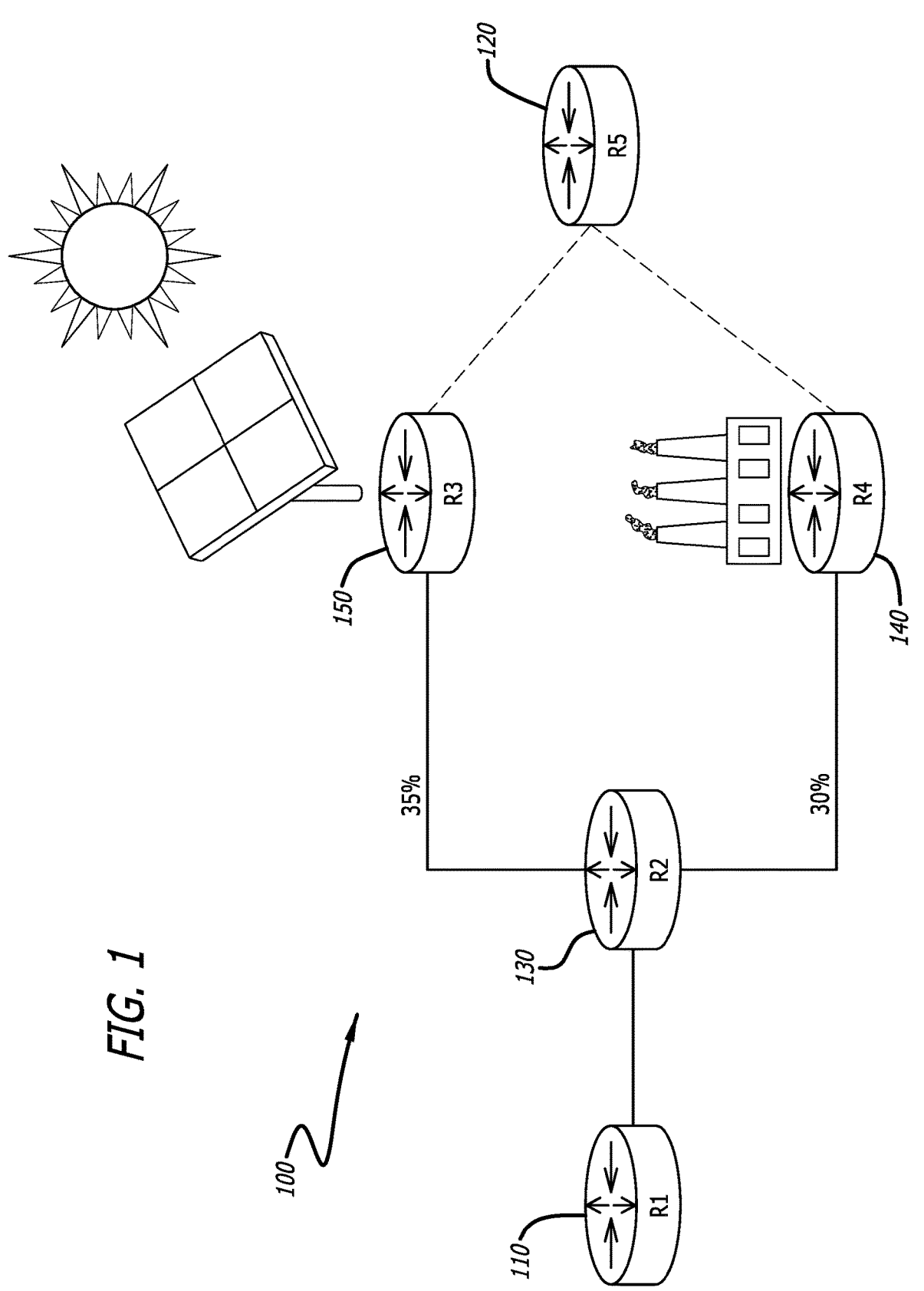
FIG. 1 is a schematic diagram of a network 100 with network devices powered by various power source types in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that facilitate the benchmarking of sustainability in information technology (IT) infrastructure. In many embodiments, a data collection module may gather sustainability-based telemetry metrics from a variety of sources, such as, but not limited to, network elements, network appliances, internet of things (IoT) endpoints, and/or building management systems. In a number of embodiments, a computation module can establish benchmarks based on the collected metrics and/or a network sustainability index.

In a variety of embodiments, the telemetry metrics may include a power usage metric. The power usage metric can indicate the amount of power or energy consumed (e.g., in kilowatts (kW) or kilowatt-hours (kWh)) per device, per device component, per device family, and/or per network. In some embodiments, the power usage metric may be associated with various time granularities. By way of non-limiting examples, the power usage metric can indicate the amount of energy consumption during the last hour, the last day, the last week, and/or the last month, and so on. In more embodiments, the telemetry metrics can also include a first power saved metric. The first power saved metric may indicate an amount of power or energy saved due to the utilization of a low power/power saving mode at one or more devices. By way of a non-limiting example, the first power saved metric can indicate an amount of energy saved based on placing one or more access points (APs) into the power saving mode. The amount of energy so saved may depend on the number of APs that support or can be switched into the power saving mode. In additional embodiments, the telemetry metrics may also include a second power saved metric. The second power saved metric can indicate an amount of power or energy saved due to device configurations. By way of a non-limiting example, a device configuration that reallocates AP power to different radios while the AP operates on power over Ethernet (PoE) may help to save power. By way of another non-limiting example, a device configuration that disables the 2.4 GHz radio at the AP while the AP is operating on the 6 GHz band can help to save power. By way of yet another non-limiting example, a device configuration that enables the AP to utilize power saving insights (e.g., power saving and feature trends based on historical data) may help to save power.

In further embodiments, a sustainability management module may, via a user interface, visually display the telemetry metrics. By way of non-limiting examples, the user interface can display one or more of the power usage metric, the first power saved metric, and/or the second power saved metric. In still more embodiments, a computation module may compute sustainability benchmarks based on various types of inputs. The sustainability benchmarks can indicate sustainability-related baselines and trends across devices and/or networks. In still further embodiments, the inputs can include the telemetry metrics as described in detail above, which may include, by way of non-limiting examples, the power usage metric, the first power saved metric, and/or the second power saved metric. In still additional embodiments, the inputs can include network sustainability indexes of one or more devices. In some more embodiments, the network sustainability index of a device may be calculated based on one or more of a reporting parameter of the device, an optimization parameter of the device, and/or an energy efficiency rating of the device. In certain embodiments, the reporting parameter of a device can include, by way of non-limiting examples, indications of a power consumption reporting capability of the device, a power consumption reporting granularity (e.g., component level reporting, port level report, etc.) of the device, and/or a power consumption reporting frequency of the device. In yet more embodiments, the optimization parameter of a device may include, by way of a non-limiting example, an indication of the capability of the device to participate in network energy optimization operations. In still yet more embodiments, the reporting parameter of the device, the optimization parameter of the device, and/or the energy efficiency rating of the device can be associated with respective weights in the calculation of the network sustainability index of the device.

In many further embodiments, the sustainability benchmarks computed by the computation module may include one or more of single device benchmarks, internal network wide benchmarks, and/or external network wide benchmarks. In many additional embodiments, a single device benchmark can capture energy consumption trends of a single device over time. The energy consumption trends of the device may be overlaid against the context of device utilization (e.g., traffic throughput across interfaces). In still yet further embodiments, an internal network wide benchmark may compare different sites or buildings within the same organization (e.g., the same company) (e.g., Building 22 of the company versus Building 23 of the company). In still yet additional embodiments, the external network wide benchmark can compare the entire network of an organization to the networks of the industry peers of the organization. Accordingly, in several embodiments, the sustainability benchmarks may provide visibility into where an organization is in its sustainability journey. In several more embodiments, if a network or a device in the network is performing worse, sustainability-wise, than a comparable peer network or peer device, the sustainability management module can suggest actionable items (actionable insights) for the organization to improve its sustainability posture. By way of a non-limiting example, an actionable item may include upgrading software of a device to a version that is associated with reduced power consumption. By way of another non-limiting example, an actionable item can include upgrading hardware of a device to a more power efficient stock-keeping unit (SKU). By way of yet another non-limiting example, an actional item may include modifying device configuration of a device to enable power saving features.

Accordingly, in numerous embodiments, the sustainability benchmarks may not be based on just the total energy consumption because a benchmark based only on the total energy consumption is inherently biased toward smaller networks. By way of a non-limiting example, a smaller network that consumes less total energy may be considered better performing if the evaluation is based on a sustainability benchmark calculated based on just the total energy consumption, even if the network includes many energy-inefficient devices. Such an evaluation can be misleading and unhelpful. Rather, in numerous additional embodiments, the sustainability benchmarks may be normalized, such that the network size does not introduce bias in the sustainability benchmarks. In further additional embodiments, a sustainability benchmark can be computed based on a combination of the network sustainability index(es), as described in detail above, and the average energy consumption per unit (e.g., per gigabytes (GB)) of delivered traffic. In some embodiments, the network sustainability index(es) and the average energy consumption may be combined based on a weighting function. In other words, the network sustainability index (es) and the average energy consumption can be associated with respective weights. In more embodiments, the average energy consumption per unit of delivered traffic may be calculated by dividing the energy consumption of all the network devices of the network over a period of time by the aggregate data volume of the outflows from the network towards endpoints over the same period of time. In additional embodiments, the average energy consumption per unit of delivered traffic for a network can be computed and/or updated on a periodic basis (e.g., (approximately) every x minutes, hourly, every x hours, daily, every x days, weekly, every x weeks, monthly, etc.). In further embodiments, the periodical time series for the historical average energy consumption per unit of delivered traffic for a network may be utilized to establish an energy consumption baseline for the network. In still more embodiments, the energy consumption baseline for the network can be established based on the time series and any of the appropriate trend analysis techniques. In still further embodiments, an industry average regarding the average energy consumption per unit of delivered traffic may be determined based on the energy consumption baselines for the networks belonging to the same general industry. In still additional embodiments, the sustainability management module can cause a comparison between the average energy consumption per unit of delivered traffic and/or the energy consumption baseline of the network and the industry average to be displayed (e.g., via a web portal) to a user (e.g., an information technology (IT) staff member). In some more embodiments, the comparison displayed to the user may take the form of or may include one or more peer comparison charts.

In certain embodiments, the system may be implemented in a centralized management platform. This can allow for easy access and control over the system, facilitating the efficient management of sustainability in IT infrastructure. By providing a comprehensive and unbiased benchmarking of sustainability, the system may enable IT professionals to effectively assess and improve the energy utilization of their infrastructure.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like.

Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram of a network 100 with network devices powered by various power source types in accordance with an embodiment of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes.

Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-10 as required to realize a particularly desired embodiment. Augmented protocols to carry out these described processes are described below.

Figure 2:
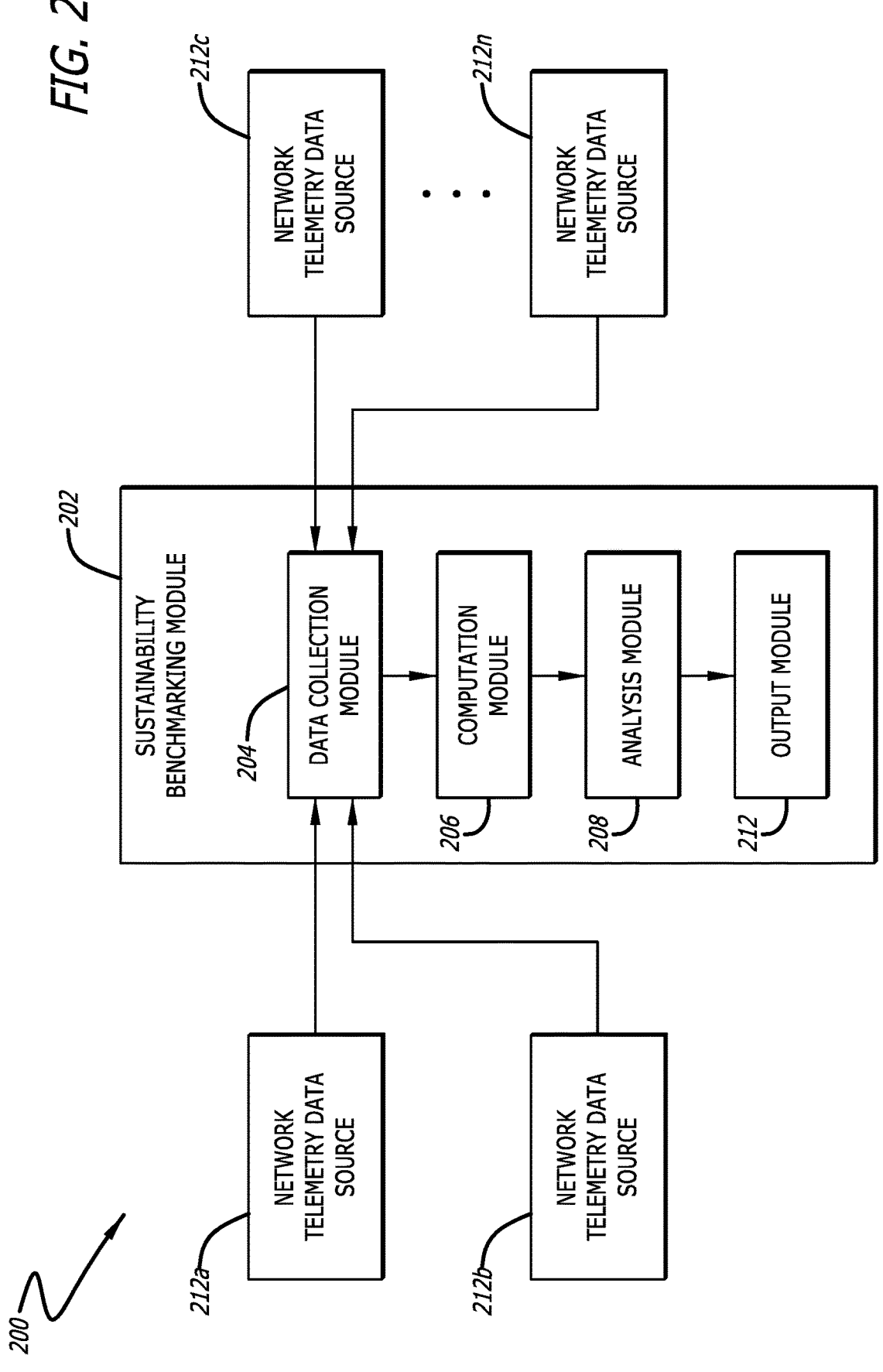
FIG. 2 is a diagram illustrating a sustainability benchmarking module in accordance with various embodiments of the disclosure.

Referring to FIG. 2, a diagram 200 illustrating a sustainability benchmarking module in accordance with various embodiments of the disclosure is shown. In many embodiments, the sustainability benchmarking module 202 may include a data collection module 204. The data collection module 204 can gather sustainability-related telemetry metrics. In a number of embodiments, the telemetry metrics may be collected from a variety of network telemetry data sources 212a, 212b, 212c, . . . , 212n. In a variety of embodiments, the network telemetry data sources 212a, 212b, 212c, . . . , 212n can include, but may not be limited to, network elements, network appliances, IoT endpoints, and/or building management systems. In some embodiments, the telemetry metrics may include a power usage metric. The power usage metric can indicate the amount of power or energy consumed (e.g., in kW or kWh) per device, per device component, per device family, and/or per network. In more embodiments, the power usage metric may be associated with various time granularities. By way of non-limiting examples, the power usage metric can indicate the amount of energy consumption during the last hour, the last day, the last week, and/or the last month, and so on. In additional embodiments, the telemetry metrics can also include a first power saved metric. The first power saved metric may indicate an amount of power or energy saved due to the utilization of a low power/power saving mode at one or more devices. By way of a non-limiting example, the first power saved metric can indicate an amount of energy saved based on placing one or more APs into the power saving mode. The amount of energy so saved may depend on the number of APs that support or can be switched into the power saving mode. In further embodiments, the telemetry metrics may also include a second power saved metric. The second power saved metric can indicate an amount of power or energy saved due to device configurations.

In still more embodiments, the sustainability benchmarking module 202 may include a computation module 206. The telemetry metrics collected by the data collection module can be passed to the computation module 206. In still further embodiments, the computation module 206 may process the collected telemetry metrics to establish sustainability benchmarks. In still additional embodiments, the sustainability benchmarks can be based on the collected telemetry metrics and one or more network sustainability indexes. In some more embodiments, the network sustainability index of a device may be calculated based on one or more of a reporting parameter of the device, an optimization parameter of the device, and/or an energy efficiency rating of the device. In certain embodiments, the reporting parameter of a device can include, by way of non-limiting examples, indications of a power consumption reporting capability of the device, a power consumption reporting granularity (e.g., component level reporting, port level report, etc.) of the device, and/or a power consumption reporting frequency of the device. In yet more embodiments, the optimization parameter of a device may include, by way of a non-limiting example, an indication of the capability of the device to participate in network energy optimization operations. In still yet more embodiments, the reporting parameter of the device, the optimization parameter of the device, and/or the energy efficiency rating of the device can be associated with respective weights in the calculation of the network sustainability index of the device.

In many further embodiments, the sustainability benchmarking module 202 may include an analysis module 208. The analysis module 208 can use the sustainability benchmarks computed by the computation module 206 to establish baselines and trends across devices and networks. In many additional embodiments, the process may allow the sustainability management system to track the energy consumption trends of a single device over time, as well as compare different sites or buildings within the same organization or compare the entire network of an organization to the industry peers of the organization. In still yet further embodiments, a single device benchmark can capture energy consumption trends of a single device over time. The energy consumption trends of the device may be overlaid against the context of device utilization (e.g., traffic throughput across interfaces). In still yet additional embodiments, an internal network wide benchmark may compare different sites or buildings within the same organization (e.g., the same company) (e.g., Building 22 of the company versus Building 23 of the company). In several embodiments, the external network wide benchmark can compare the entire network of an organization to the networks of the industry peers of the organization. Accordingly, in several more embodiments, the sustainability benchmarks may provide visibility into where an organization is in its sustainability journey.

In numerous embodiments, the sustainability benchmarking module 202 may include an output module 212. The output module 212 can provide visibility to users (e.g., IT staff members) on their sustainability journey. In numerous additional embodiments, if the network or device is underperforming compared to its peers, the output module 212 can suggest actionable insights for improvement. In further additional embodiments, the recommendations may include one or more of upgrading device software to reduce power consumption, upgrading device hardware to a more power-efficient SKU, and/or modifying device configuration to enable power-saving features. In some embodiments, the output module 212 can cause a comparison between the average energy consumption per unit of delivered traffic and/or the energy consumption baseline of the network and the industry average to be displayed (e.g., via a web portal) to a user (e.g., an IT staff member). In more embodiments, the comparison displayed to the user may take the form of or may include one or more peer comparison charts.

Although a specific embodiment for a sustainability benchmarking module suitable for carrying out the various steps, processes, methods, and operations described herein is discussed with respect to FIG. 2, any of a variety of systems and/or processes may be utilized in accordance with embodiments of the disclosure. For example, the data collection module may be configured to collect telemetry metrics in real-time or from a variety of network devices. The elements depicted in FIG. 2 may also be interchangeable with other elements of FIGS. 1 and 3-10 as required to realize a particularly desired embodiment.

Figure 3:
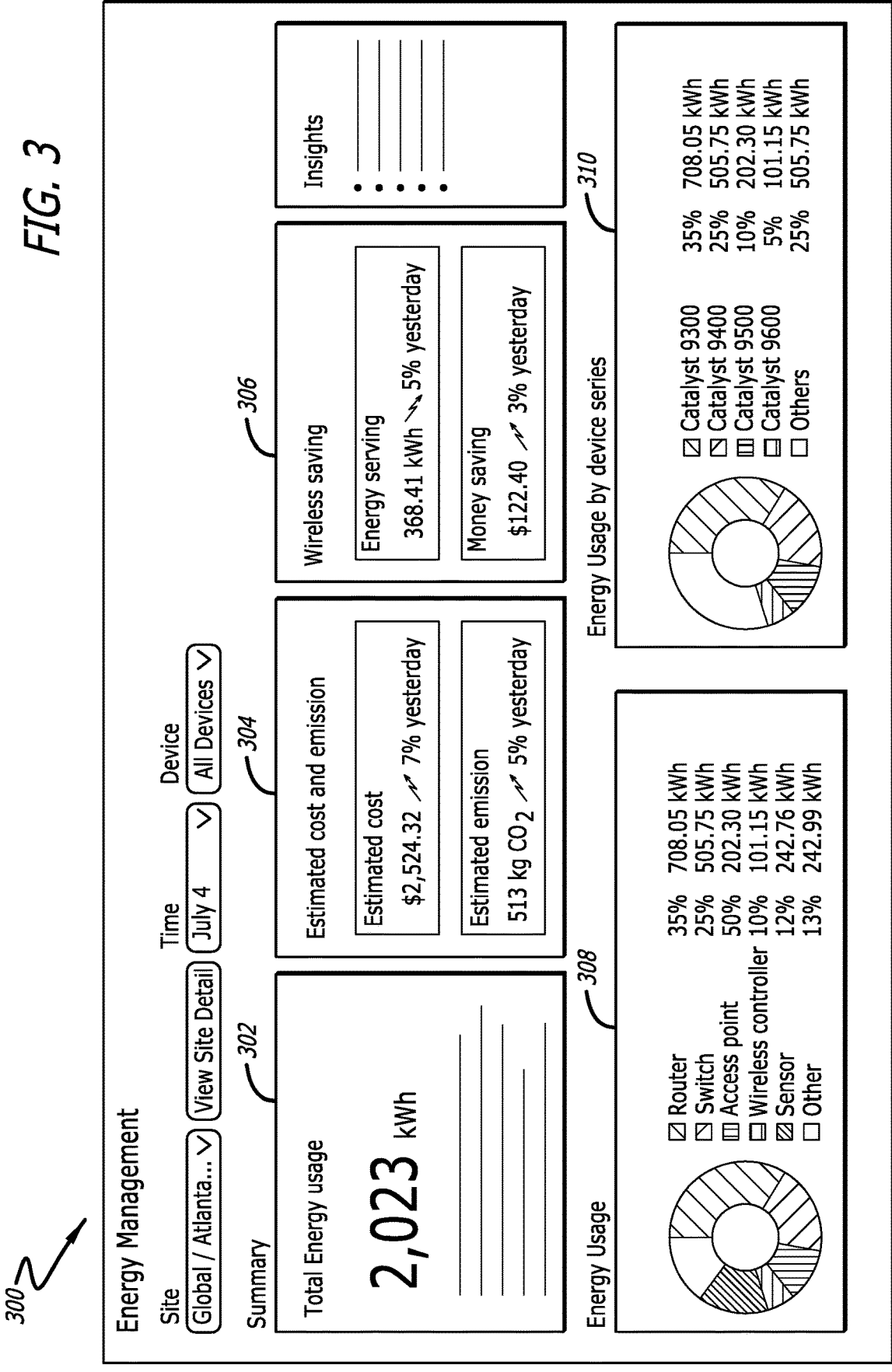
FIG. 3 is a diagram illustrating a sustainability management dashboard in accordance with various embodiments of the disclosure.

Referring to FIG. 3, a diagram illustrating a sustainability management dashboard 300 in accordance with various embodiments of the disclosure is shown. The sustainability management dashboard 300 may provide a comprehensive overview of the energy usage and savings in the IT infrastructure. In many embodiments, the sustainability management dashboard 300 can display, at 302, the total energy usage/consumption of the network (e.g., the total energy usage over a day in kWh). The data may provide a snapshot of the energy consumption of the IT infrastructure over a specific period, allowing users to monitor and manage their energy usage.

In a number of embodiments, the sustainability management dashboard 300 can show, at 304, the estimated energy use cost (e.g., a cost in dollars) and the estimated carbon dioxide (CO2) emission associated with the energy consumption as displayed at 302. The feature may provide a clear understanding of the financial and environmental impact of the energy consumption, enabling users to make informed decisions about their energy usage. In a variety of embodiments, the sustainability management dashboard 300 can show, at 306, an amount of the energy saved (e.g., in kWh) based on the low power/power saving mode implemented at wireless APs. Specifically, in some embodiments, the total energy saving, the corresponding amount of money saved, and the greenhouse gas emission reduced may be displayed. The data can help users to understand the effectiveness of their power-saving measures and to identify areas for further improvement.

In more embodiments, actionable insights (e.g., recommended actional items) can also be shown on the sustainability management dashboard 300. The insights may provide specific recommendations for reducing energy consumption and improving sustainability. In additional embodiments, the recommendations may include one or more of upgrading device software to reduce power consumption, upgrading device hardware to a more power-efficient SKU, and/or modifying device configuration to enable power-saving features.

In further embodiments, the sustainability management dashboard 300 can show, at 308, the amounts of energy usage by device family. By way of non-limiting examples, the device families may include routers, switches, APs, wireless controllers, sensors, and/or other PoE devices, and so on. Therefore, the feature may allow users to compare the energy usage of different types of devices and to identify any particularly energy-intensive device families. In still more embodiments, the sustainability management dashboard 300 can show, at 310, the amounts of energy usage by device series. The feature may provide a more detailed breakdown of the energy usage, enabling users to identify any specific device series that are consuming a significant amount of energy.

Although a specific embodiment for a sustainability management dashboard suitable for carrying out the various steps, processes, methods, and operations described herein is discussed with respect to FIG. 3, any of a variety of systems and/or processes may be utilized in accordance with embodiments of the disclosure. For example, the dashboard may include additional features such as, but not limited to, real-time energy usage updates, predictive energy usage modeling, or detailed energy usage reports. The elements depicted in FIG. 3 may also be interchangeable with other elements of FIGS. 1, 2 and 4-10 as required to realize a particularly desired embodiment.

Figure 4:
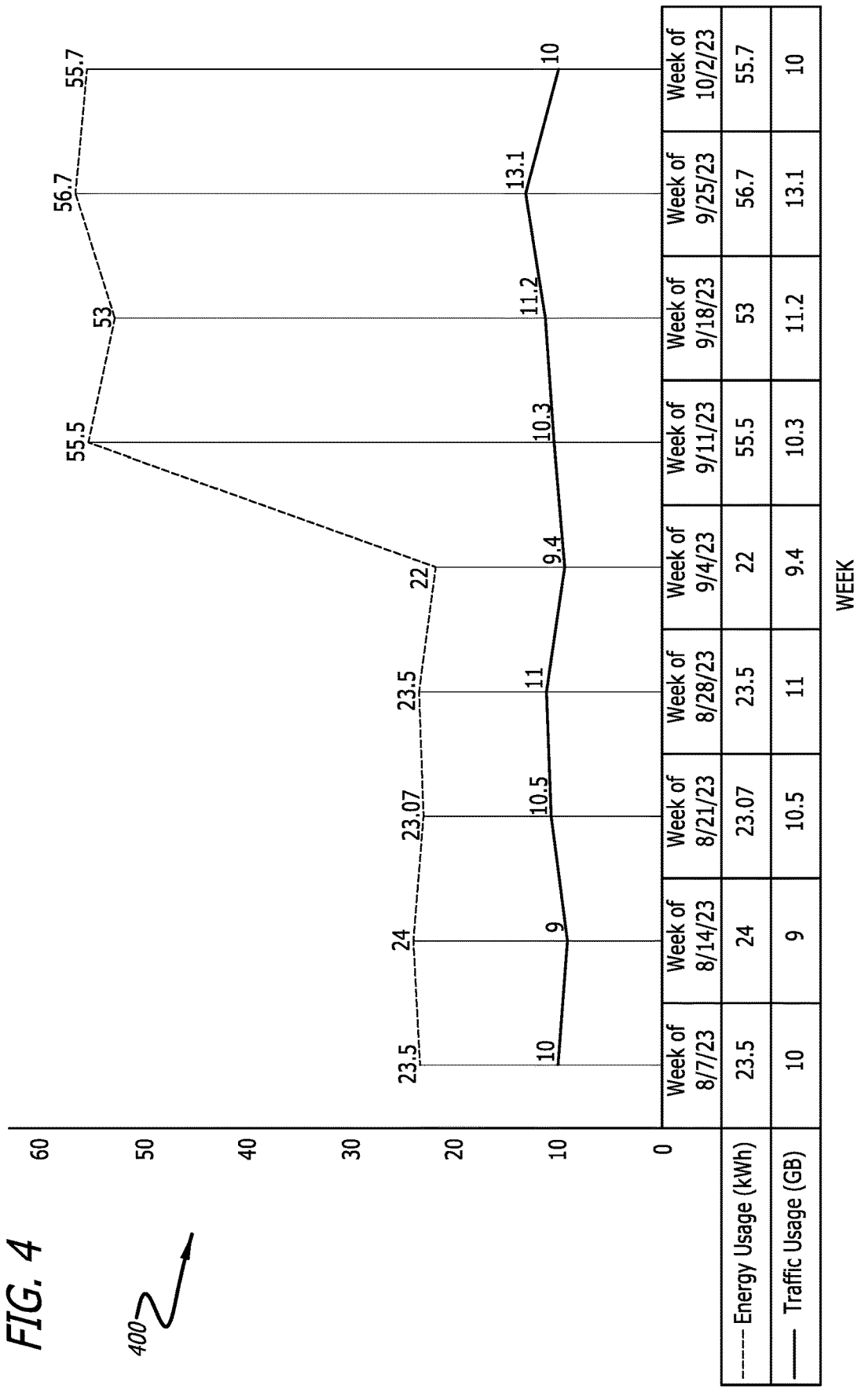
FIG. 4 is a diagram illustrating data associated with single device sustainability benchmarking in accordance with various embodiments of the disclosure.

Referring to FIG. 4, a diagram 400 illustrating data associated with single device sustainability benchmarking in accordance with various embodiments of the disclosure is shown. The data may provide a detailed view of the weekly energy usage in kWh and traffic usage in GBs for a period of nine weeks, from the week of Aug. 7, 2023 to the week of Oct. 2, 2023. The detailed view can allow for a granular understanding of the energy consumption patterns of the device and their correlation with the traffic usage.

In the embodiments shown in FIG. 4, it may be observed that the weekly energy usage for the initial five weeks, from the week of Aug. 7, 2023 to the week of Sep. 4, 2023, remains relatively stable, fluctuating between 22 kWh and 24 kWh. During this period, the traffic usage also remains fairly constant, ranging from 9 GBs to 11 GBs. The consistent pattern can suggest a stable relationship between the energy usage and traffic usage during this period.

A significant change in the energy usage pattern may be noted starting from the week of Sep. 11, 2023. Despite the traffic usage remaining relatively constant, ranging from 9.4 GBs to 13.1 GBs, the energy usage sees a substantial increase, rising to 55.5 kWh in the week of Sep. 11, 2023 and remaining above 53 kWh for the subsequent weeks. This increase in energy usage, despite the relatively constant traffic usage, can indicate a potential inefficiency in the energy consumption of the device. In particular, the sudden rise in energy usage without a corresponding increase in traffic usage may suggest a number of potential issues, such as, but not limited to, a hardware malfunction, a software issue, or a change in the operating conditions of the device. The data, therefore, can highlight the importance of regular sustainability benchmarking in identifying such issues and ensuring the efficient operation of the devices.

Although a specific embodiment for single device sustainability benchmarking suitable for carrying out the various steps, processes, methods, and operations described herein is discussed with respect to FIG. 4, any of a variety of systems and/or processes may be utilized in accordance with embodiments of the disclosure. For example, the benchmarking can be performed on a daily or monthly basis, or the data may be analyzed to identify patterns in the energy usage of the device over different periods of the day. The elements depicted in FIG. 4 may also be interchangeable with other elements of FIGS. 1-3 and 5-10 as required to realize a particularly desired embodiment.

Figure 5:
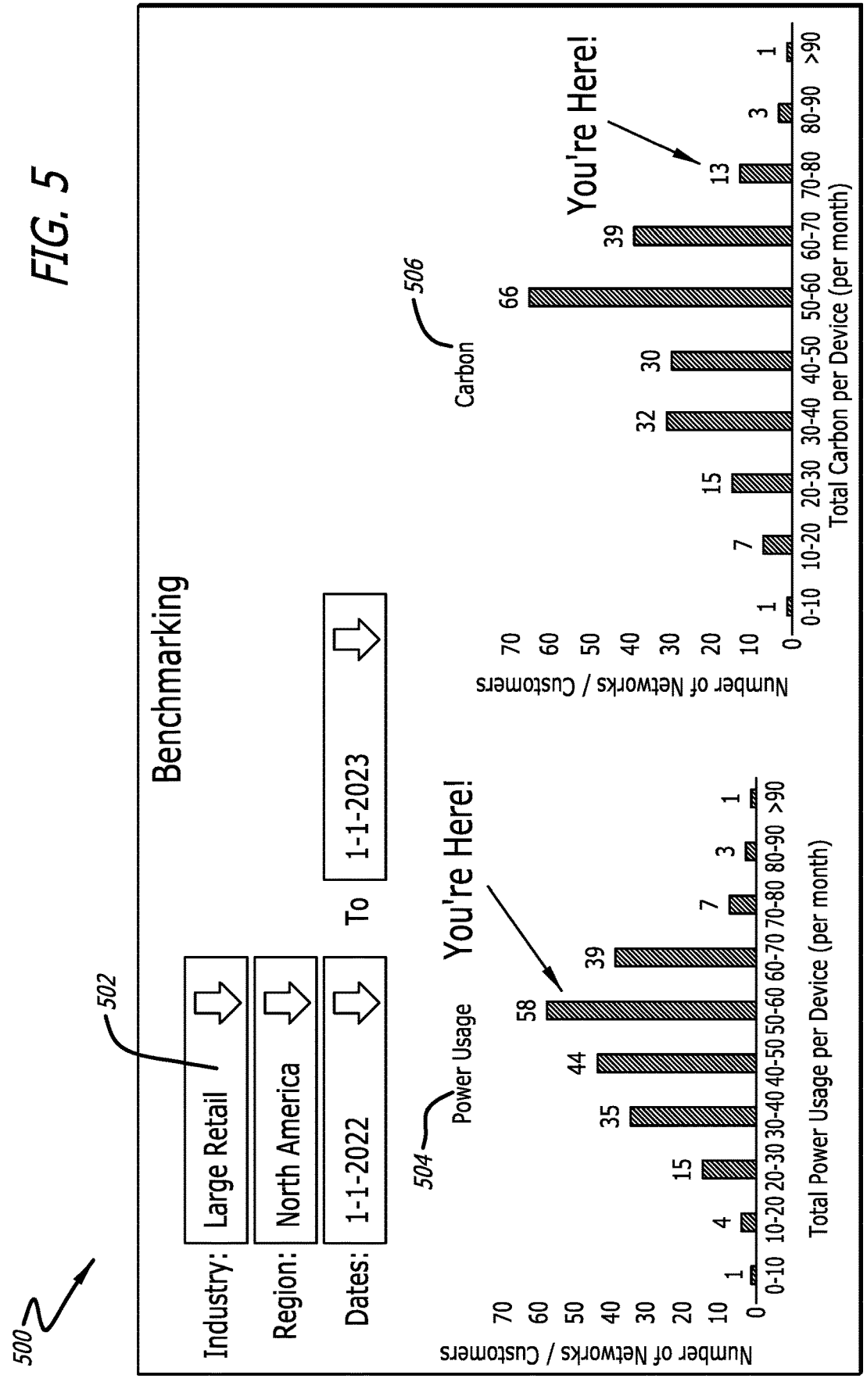
FIGS. 5 and 6 are diagrams illustrating industry-wide benchmarking results in accordance with various embodiments of the disclosure.
Figure 6:
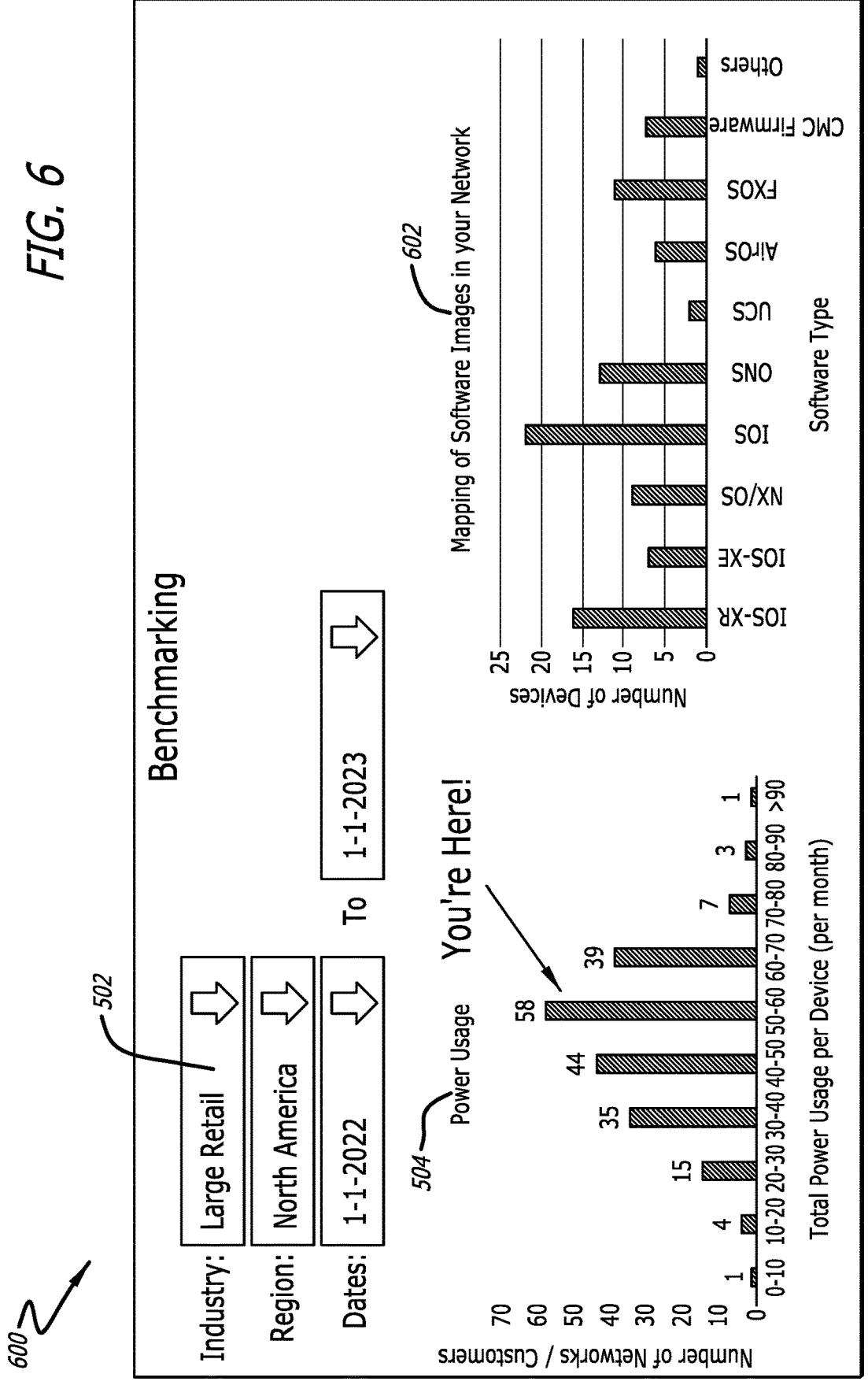

Referring to FIGS. 5 and 6, diagrams 500 and 600 illustrating industry-wide benchmarking results in accordance with various embodiments of the disclosure are shown. In the embodiments shown in FIGS. 5 and 6, the benchmarking results may be for the "Large Retail" industry in the North America region for the year 2022. At 502, in many embodiments, the industry, region, and date range can be specified, allowing the users to select the context for the benchmarking results. The industry-wide benchmarking may allow organizations to compare their energy usage and carbon emissions with other networks or customers in the same industry.

At 504, in a number of embodiments, a histogram can display the distribution of networks or customers in the "Large Retail" industry across different ranges of per device power usage per month. The histogram may visually represent the number of networks or customers that fall within each power usage range. It can be observed from the histogram that the per device power usage per month of the organization may fall in the 50-60 W range, suggesting that its per device power usage may be relatively high compared to other networks or customers in the same industry.

At 506, in a variety of embodiments, another histogram can show the distribution of networks or customers in the "Large Retail" industry across different ranges of per device carbon emission per month. The histogram may visually represent the number of networks or customers that fall within each carbon emission range. It can be observed from the histogram that the per device carbon emission per month of the device may fall in the 70-80 kilograms (kg) range, suggesting that its per device carbon emission may also be relatively high compared to other networks or customers in the same industry.

Referring to FIG. 6, at 602, in some embodiments, yet another histogram may show the distribution of devices in the network of the organization across different software images. This histogram can visually represent the number of devices running each type of software. The data can be useful, when combined with other data, for identifying any software types that may be particularly energy-intensive or that can contribute significantly to the carbon emissions of the organization.

Although specific embodiments for industry-wide benchmarking results suitable for carrying out the various steps, processes, methods, and operations described herein are discussed with respect to FIGS. 5 and 6, any of a variety of systems and/or processes may be utilized in accordance with embodiments of the disclosure. For example, the benchmarking may be performed for different industries, regions, and/or time periods. The elements depicted in FIGS. 5 and 6 may also be interchangeable with other elements of FIGS. 1-4 and 7-10 as required to realize a particularly desired embodiment.

Figure 7:
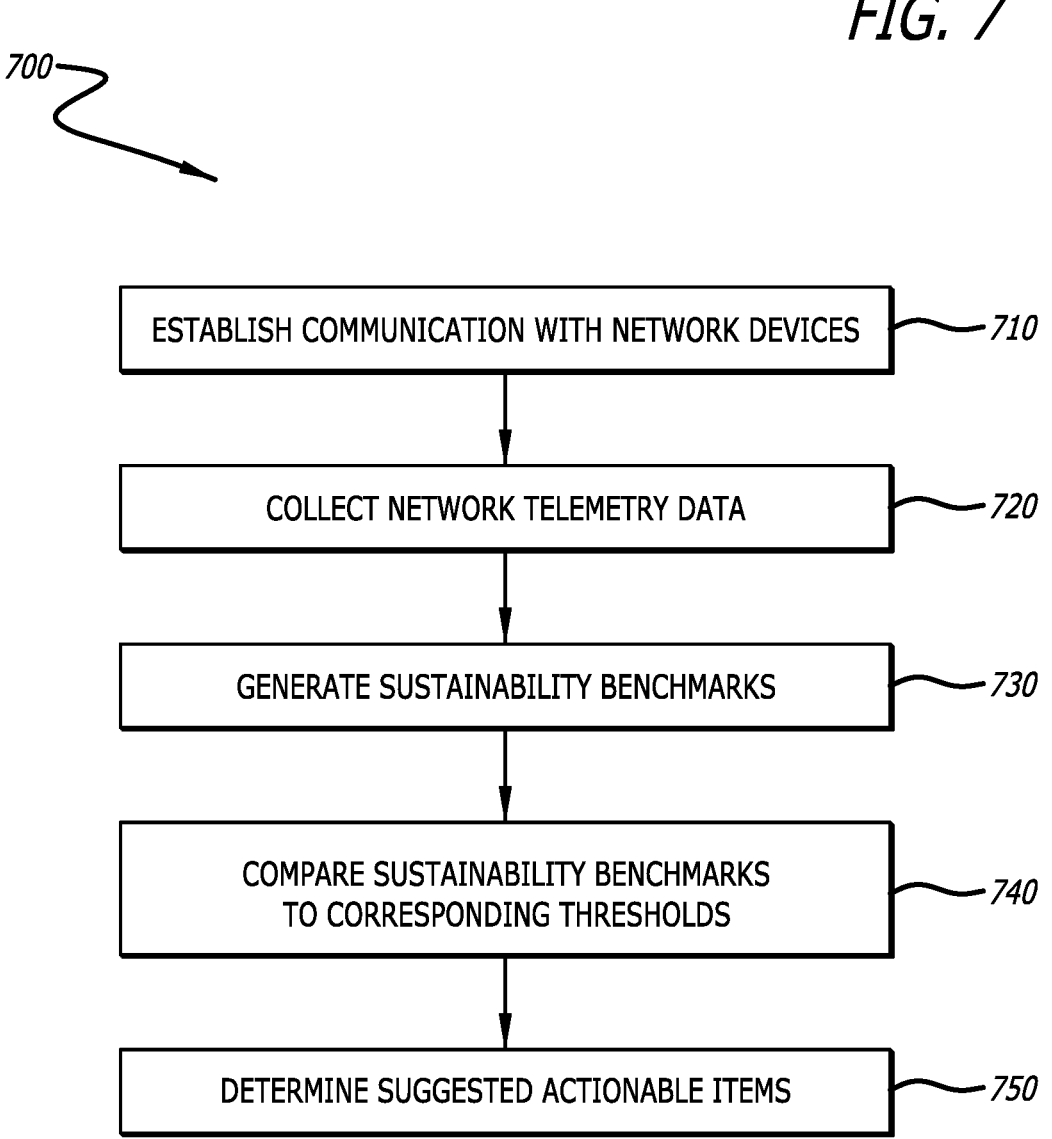
FIG. 7 is a flowchart showing a process for managing sustainability in a network in accordance with various embodiments of the disclosure.

Referring to FIG. 7, a flowchart showing a process 700 for managing sustainability in a network in accordance with various embodiments of the disclosure is shown. In many embodiments, the process 700 may establish communication with network devices (block 710). In a number of embodiments, this can involve initiating a connection with the devices, authenticating the connection, and ensuring that data can be transmitted and received effectively. Establishing the communication may be a prerequisite for the collection of accurate and timely network telemetry data.

In a variety of embodiments, the process 700 may collect network telemetry data (block 720). In some embodiments, the telemetry data may be related to network sustainability. In more embodiments, the telemetry data can include power usage data, power saving data, and/or other relevant data. In additional embodiments, the telemetry data may be associated with one or more of individual devices, device components, device families, and/or the entire network.

In further embodiments, the process 700 may generate sustainability benchmarks based on the collected network telemetry data (block 730). In still more embodiments, the sustainability benchmarks can be associated with one or more of individual devices, parts of the network, and/or the entire network. In still further embodiments, the sustainability benchmarks may be generated based further on network sustainability indexes. In still additional embodiments, the sustainability benchmarks can include one or more of device benchmarks, internal network-wide benchmarks, and/or external network-wide benchmarks. In some more embodiments, a sustainability benchmark may represent a baseline or a trend related to network sustainability. In certain embodiments, a sustainability benchmark can be associated with power consumption and/or carbon footprint.

In yet more embodiments, the process 700 may compare the generated sustainability benchmarks to corresponding thresholds (block 740). In still yet more embodiments, the comparison can identify benchmarks that are less than their corresponding thresholds, indicating areas where the sustainability performance of the network may be improved. In many further embodiments, the thresholds may be determined in a variety of ways, such as empirically based on historical data, or by using industry averages and trends to set benchmarks for acceptable levels of energy usage and carbon emissions.

In many additional embodiments, the process 700 may determine suggested actionable items (block 750). In still yet further embodiments, the suggested actionable items can be determined in response to at least one of the sustainability benchmarks being less than a corresponding threshold. In still yet additional embodiments, the actionable items may include one or more of upgrading the software or hardware of a device, adjusting a device configuration, and/or other actions that may improve the sustainability performance of the network.

Although a specific embodiment for managing sustainability in a network suitable for carrying out the various steps, processes, methods, and operations described herein is discussed with respect to FIG. 7, any of a variety of systems and/or processes may be utilized in accordance with embodiments of the disclosure. For example, the process may be adapted to manage sustainability in different types of networks. The elements depicted in FIG. 7 may also be interchangeable with other elements of FIGS. 1-6 and 8-10 as required to realize a particularly desired embodiment.

Figure 8:
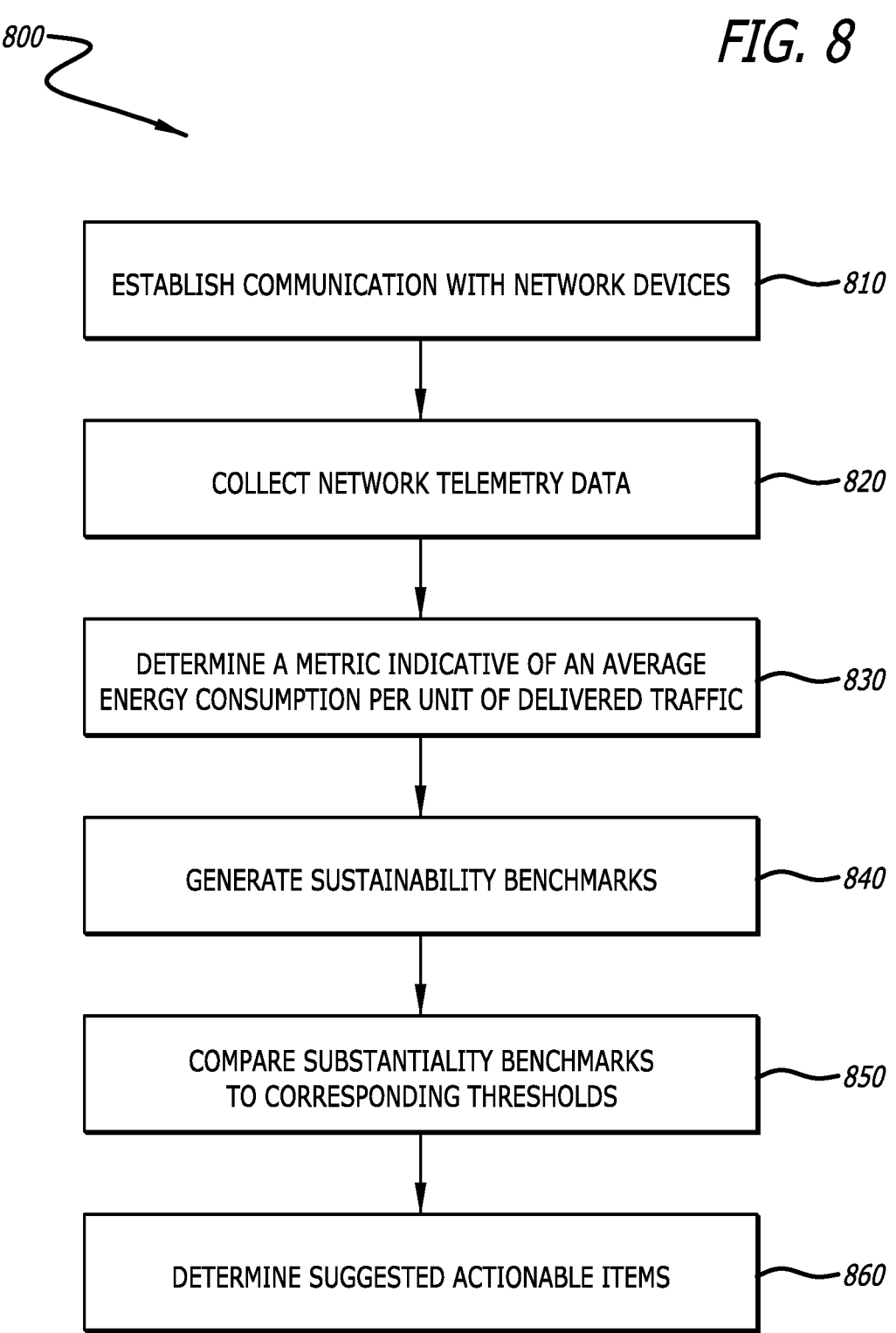
FIG. 8 is a flowchart showing a process for managing sustainability in a network in accordance with various embodiments of the disclosure.

Referring to FIG. 8, a flowchart showing a process 800 for managing sustainability in a network in accordance with various embodiments of the disclosure is shown. In many embodiments, the process 800 may establish communication with network devices (block 810). In a number of embodiments, this can involve initiating a connection with the devices, authenticating the connection, and ensuring that data can be transmitted and received effectively. Establishing the communication may be a prerequisite for the collection of accurate and timely network telemetry data.

In a variety of embodiments, the process 800 may collect network telemetry data (block 820). In some embodiments, the telemetry data may be related to network sustainability. In more embodiments, the telemetry data can include power usage data, power saving data, and/or other relevant data. In additional embodiments, the telemetry data may be associated with one or more of individual devices, device components, device families, and/or the entire network.

In further embodiments, the process 800 may determine a metric indicative of an average energy consumption per unit of delivered traffic (block 830). The metric can provide a measure of the efficiency of the network in terms of energy usage that is not biased toward smaller networks. In still more embodiments, the metric may be calculated based on the collected network telemetry data and can be updated periodically to reflect changes in the network operation.

In still further embodiments, the process 800 may generate sustainability benchmarks (block 840). In still additional embodiments, the sustainability benchmarks can be associated with one or more of individual devices, parts of the network, and/or the entire network. In some more embodiments, the sustainability benchmarks may be generated based further on network sustainability indexes. In certain embodiments, the sustainability benchmarks can include one or more of device benchmarks, internal network-wide benchmarks, and/or external network-wide benchmarks. In yet more embodiments, a sustainability benchmark may represent a baseline or a trend related to network sustainability. In still yet more embodiments, a sustainability benchmark can be associated with power consumption and/or carbon footprint. In many further embodiments, a sustainability benchmark may be generated based further on the metric indicative of the average energy consumption per unit of delivered traffic.

In many additional embodiments, the process 800 may compare the generated sustainability benchmarks to corresponding thresholds (block 850). In still yet further embodiments, the comparison can identify benchmarks that are less than their corresponding thresholds, indicating areas where the sustainability performance of the network may be improved. In still yet additional embodiments, the thresholds may be determined in a variety of ways, such as empirically based on historical data, or by using industry averages and trends to set benchmarks for acceptable levels of energy usage and carbon emissions.

In several embodiments, the process 800 may determine suggested actionable items in response to at least one of the sustainability benchmarks being less than a corresponding threshold (block 860). In several more embodiments, the suggested actionable items can be determined in response to at least one of the sustainability benchmarks being less than a corresponding threshold. In numerous embodiments, the actionable items may include one or more of upgrading the software or hardware of a device, adjusting a device configuration, and/or other actions that may improve the sustainability performance of the network.

Although a specific embodiment for managing sustainability in a network suitable for carrying out the various steps, processes, methods, and operations described herein is discussed with respect to FIG. 8, any of a variety of systems and/or processes may be utilized in accordance with embodiments of the disclosure. For example, the process may be modified to include additional metrics related to other aspects of sustainability, such as, but not limited to, water usage or waste production, to provide a more comprehensive view of the environmental impact of the network. The elements depicted in FIG. 8 may also be interchangeable with other elements of FIGS. 1-7, 9, and 10 as required to realize a particularly desired embodiment.

Referring to FIG. 9, a flowchart showing a process 900 for managing sustainability in a network in accordance with various embodiments of the disclosure is shown. In many embodiments, the process 900 may establish communication with network devices (block 910). In a number of embodiments, this can involve initiating a connection with the devices, authenticating the connection, and ensuring that data can be transmitted and received effectively. Establishing the communication may be a prerequisite for the collection of accurate and timely network telemetry data.

In a variety of embodiments, the process 900 may collect network telemetry data (block 920). In some embodiments, the telemetry data may be related to network sustainability. In more embodiments, the telemetry data can include power usage data, power saving data, and/or other relevant data. In additional embodiments, the telemetry data may be associated with one or more of individual devices, device components, device families, and/or the entire network.

In further embodiments, the process 900 may determine a metric indicative of an average energy consumption per unit of delivered traffic (block 930). The metric can provide a measure of the efficiency of the network in terms of energy usage that is not biased toward smaller networks. In still more embodiments, the metric may be calculated based on the collected network telemetry data and can be updated periodically to reflect changes in the network operation.

In still further embodiments, the process 900 may generate sustainability benchmarks (block 940). In still additional embodiments, the sustainability benchmarks can be associated with one or more of individual devices, parts of the network, and/or the entire network. In some more embodiments, the sustainability benchmarks may be generated based further on network sustainability indexes. In certain embodiments, the sustainability benchmarks can include one or more of device benchmarks, internal network-wide benchmarks, and/or external network-wide benchmarks. In yet more embodiments, a sustainability benchmark may represent a baseline or a trend related to network sustainability. In still yet more embodiments, a sustainability benchmark can be associated with power consumption and/or carbon footprint. In many further embodiments, a sustainability benchmark may be generated based further on the metric indicative of the average energy consumption per unit of delivered traffic.

In many additional embodiments, the process 900 may compare the generated sustainability benchmarks to corresponding thresholds (block 950). In still yet further embodiments, the comparison can identify benchmarks that are less than their corresponding thresholds, indicating areas where the sustainability performance of the network may be improved. In still yet additional embodiments, the thresholds may be determined in a variety of ways, such as empirically based on historical data, or by using industry averages and trends to set benchmarks for acceptable levels of energy usage and carbon emissions.

In several embodiments, the process 900 may determine suggested actionable items in response to at least one of the sustainability benchmarks being less than a corresponding threshold (block 960). In several more embodiments, the suggested actionable items can be determined in response to at least one of the sustainability benchmarks being less than a corresponding threshold. In numerous embodiments, the actionable items may include one or more of upgrading the software or hardware of a device, adjusting a device configuration, and/or other actions that may improve the sustainability performance of the network.

In numerous additional embodiments, the process 900 may update the metric indicative of an average energy consumption per unit of delivered traffic (block 970). In further additional embodiments, this can involve recalculating the metric based on updated network telemetry data to reflect changes in the network operation. In some embodiments, the update may be performed periodically to ensure that the metric accurately reflects the current state of the network.

In more embodiments, the process 900 may update the sustainability benchmarks (block 980). In additional embodiments, this can involve recalculating the benchmarks based on the updated metric, network telemetry data, and/or network sustainability indexes. This update may ensure that the benchmarks accurately reflect the current sustainability performance of the network.

Although a specific embodiment for managing sustainability in a network suitable for carrying out the various steps, processes, methods, and operations described herein is discussed with respect to FIG. 9, any of a variety of systems and/or processes may be utilized in accordance with embodiments of the disclosure. For example, additional operations can be included to provide more detailed sustainability benchmarks or actionable items. The elements depicted in FIG. 9 may also be interchangeable with other elements of FIGS. 1-8 and 10 as required to realize a particularly desired embodiment.

Figure 10:
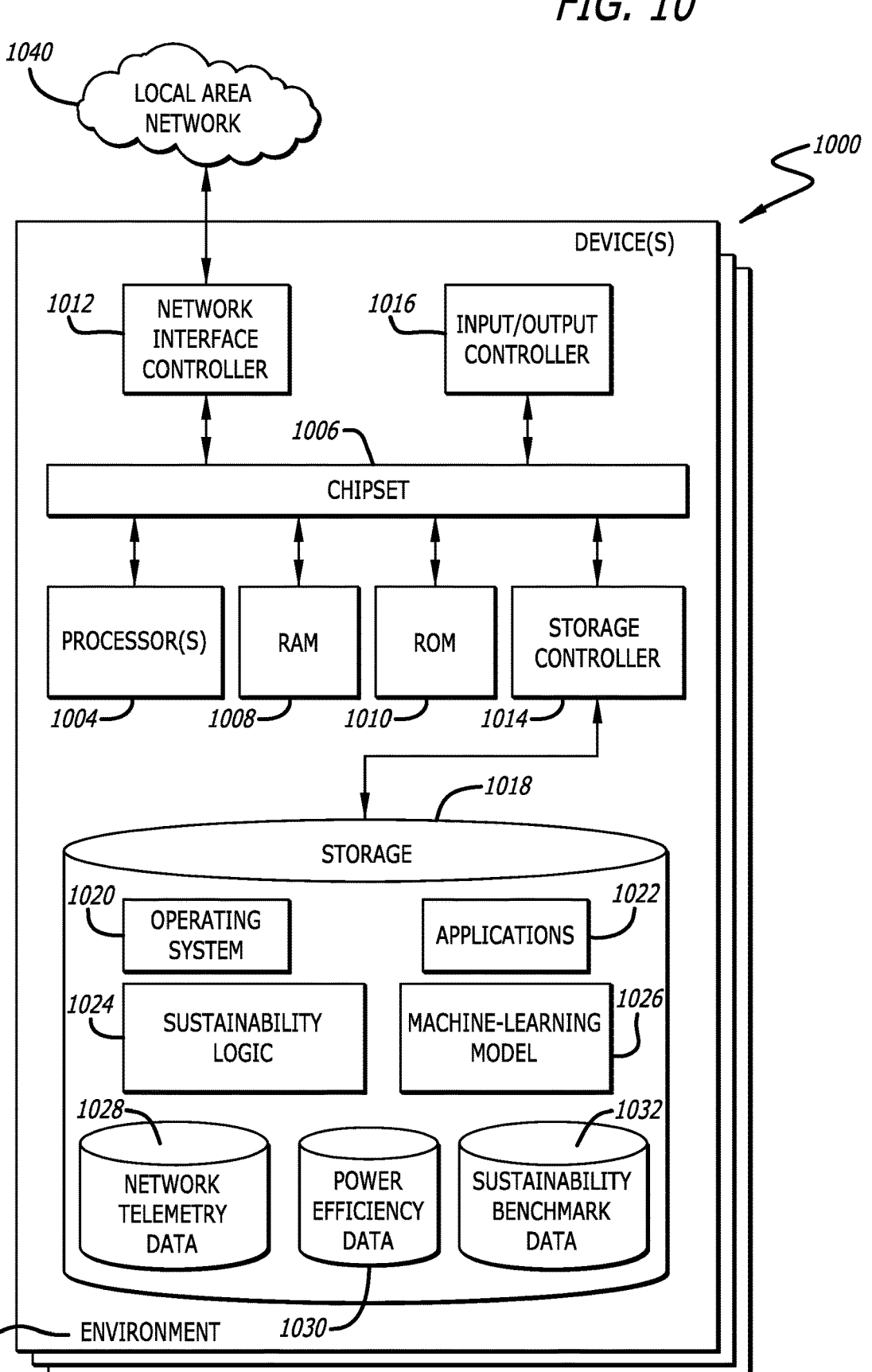
FIG. 10 is a conceptual block diagram for one or more devices capable of executing components and logic for implementing the functionality and embodiments described above.

Referring to FIG. 10, a conceptual block diagram for one or more devices 1000 capable of executing components and logic for implementing the functionality and embodiments described above is shown. The embodiment of the conceptual block diagram depicted in FIG. 10 can illustrate a conventional server computer, workstation, desktop computer, laptop, tablet, network appliance, e-reader, smartphone, or other computing device, and can be utilized to execute any of the application and/or logic components presented herein. The device 1000 may, in some examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In additional embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, network telemetry data 1028, power efficiency data 1030, and sustainability benchmark data 1032, which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10, and can include other components that are not explicitly shown in FIG. 10, or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a sustainability logic 1024. The sustainability logic 1024 may manage the sustainability operations within one or more networks. The sustainability logic 1024 can collect network telemetry data, generate sustainability benchmarks, compare the benchmarks to thresholds, and determine actionable items to improve the sustainability performance of the network.

In a number of embodiments, the storage 1018 can include network telemetry data 1028. The network telemetry data 1028 may be collected from network devices and can relate to the operation of the network devices. The network telemetry data 1028 may include aspects such as power usage, power saving data, and/or other relevant data that can be utilized to assess and improve the sustainability performance of the network.

In various embodiments, the storage 1018 can include power efficiency data 1030. The power efficiency data 1030 may relate to the energy usage efficiency of network devices. The power efficiency data 1030 can include data on power consumption, power saving modes, and/or other relevant metrics that are related to the energy efficiency and sustainability of the network.

In still more embodiments, the storage 1018 can include sustainability benchmark data 1032. The sustainability benchmark data 1032 may be generated based on the collected network telemetry data 1028 and network sustainability indexes. The sustainability benchmark data 1032 can provide a measure of the sustainability performance of the network in terms of energy usage, carbon emissions, and/or other relevant factors.

Finally, in many embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026. The ML model 1026 may be configured to analyze the collected network telemetry data, identify patterns and trends, and predict future sustainability performance, thereby aiding in the generation of more accurate sustainability benchmarks and actionable items.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network device, comprising:
a processor;
at least one network interface controller configured to provide access to a network; and
a memory communicatively coupled to the processor, wherein the memory comprises a sustainability logic that is configured to:
collect network telemetry data from the network;
generate one or more sustainability benchmarks based on the network telemetry data and a network sustainability index;
compare the generated one or more sustainability benchmarks to one or more thresholds; and
determine one or more suggested actionable items in response to at least one of the one or more sustainability benchmarks being less than a corresponding threshold.

2. The network device of claim 1, wherein the one or more sustainability benchmarks are associated with at least one of one or more devices of the network, a part of the network, or the network.

3. The network device of claim 1, wherein the network telemetry data comprises power usage data or power saving data.

4. The network device of claim 3, wherein the power usage data is associated with at least one of each of one or more first devices, each of one or more device components, each of one or more device families, or the network.

5. The network device of claim 3, wherein the power usage data corresponds to a period of time.

6. The network device of claim 3, wherein the power saving data is associated with a power saving mode or one or more device configurations.

7. The network device of claim 1, wherein the generated one or more sustainability benchmarks comprise at least one of one or more device benchmarks, one or more internal network-wide benchmarks, or one or more external network-wide benchmarks.

8. The network device of claim 1, wherein each of the generated one or more sustainability benchmarks comprises a baseline or a trend.

9. The network device of claim 1, wherein each of the generated one or more sustainability benchmarks comprises a power consumption or a carbon footprint.

10. The network device of claim 1, wherein the sustainability logic is further configured to determine, for the network, a metric indicative of an average energy consumption per unit of delivered traffic, and a sustainability benchmark associated with the network is generated based at least part on the metric.

11. The network device of claim 10, wherein the sustainability logic is further configured to periodically update the metric for the network.

12. The network device of claim 11, wherein the metric is updated for the network approximately hourly.

13. The network device of claim 1, wherein the sustainability logic is further configured to periodically update the generated one or more sustainability benchmarks.

14. The network device of claim 1, wherein the determined one or more suggested actionable items includes upgrading software of a device of the network.

15. The network device of claim 1, wherein the determined one or more suggested actionable items includes upgrading hardware of a device of the network.

16. The network device of claim 1, wherein the determined one or more suggested actionable items includes adjusting a device configuration of a device of the network.

17. The network device of claim 1, wherein the sustainability logic is further configured to cause the determined one or more suggested actionable items to be displayed to a user.

18. A network device, comprising:
a processor;
at least one network interface controller configured to provide access to a network; and
a memory communicatively coupled to the processor, wherein the memory comprises a sustainability logic that is configured to:
collect network telemetry data from the network;
generate one or more sustainability benchmarks based on the network telemetry data and a network sustainability index;
compare the generated one or more sustainability benchmarks to one or more thresholds;
determine one or more suggested actionable items in response to at least one of the one or more sustainability benchmarks being less than a corresponding threshold; and
cause the determined one or more suggested actionable items to be displayed to a user.

19. A method for managing sustainability of a network, comprising:
collecting network telemetry data from the network;
generating one or more sustainability benchmarks based on the network telemetry data and a network sustainability index;
comparing the generated one or more sustainability benchmarks to one or more thresholds; and
determining one or more suggested actionable items in response to at least one of the one or more sustainability benchmarks being less than a corresponding threshold.

* * * * *